Jan. 14, 1930.  F. GORREE  1,743,339
WORK HOLDER CLAMPING MECHANISM
Filed June 10, 1927   2 Sheets-Sheet 1
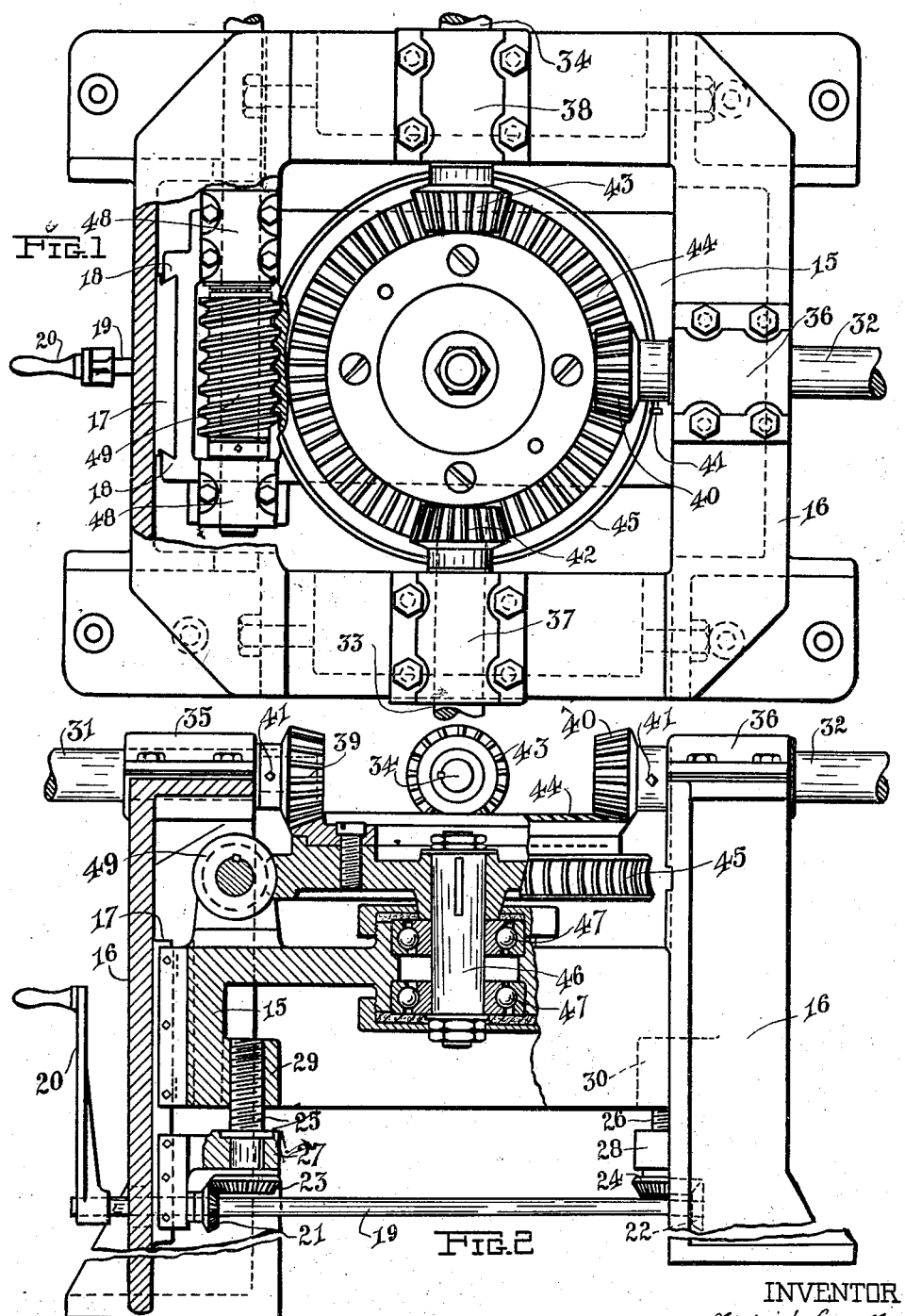
INVENTOR
Fredrick Gorree.
BY
E.J. Fetherstonhaugh
& Son.

Jan. 14, 1930.  F. GORREE  1,743,339
WORK HOLDER CLAMPING MECHANISM
Filed June 10, 1927  2 Sheets-Sheet 2

INVENTOR.
F. Gorree.
BY E. J. Featherstonhaugh
ATTORNEY.

Patented Jan. 14, 1930

1,743,339

UNITED STATES PATENT OFFICE

FREDERICK GORREE, OF STRATFORD, ONTARIO, CANADA

WORK-HOLDER-CLAMPING MECHANISM

Application filed June 10, 1927. Serial No. 197,989.

This invention relates to a workholder clamping mechanism, as described in the present specification and illustrated in the accompanying drawings which form part of the same.

The invention consists essentially of the novel features pointed out broadly and specifically in the claim for novelty following a description containing an explanation in detail of an acceptable form of the invention.

The objects of the invention are to hold the work for drilling, milling and planing operations firmly at four points from a centre adjustable in relation to the nature of the machining to be done; to tighten on the work positively from the four points simultaneously; to maintain rigidity during the operations and yet afford instant release of the grip at all points and leave the setting for similar work; to apply a gear mechanism in such a way as will materially increase the effectiveness of the grip and the efficiency of the setting in regard to accuracy; and generally, to produce a device of the kind described at a reasonable cost and of great serviceability in the machine world.

In the drawings, Figure 1 is a plan view of the clamp, partly sectional;

Figure 2 is a side view of Figure 1,

Like numerals of reference indicate corresponding parts in the various figures.

Figure 3:
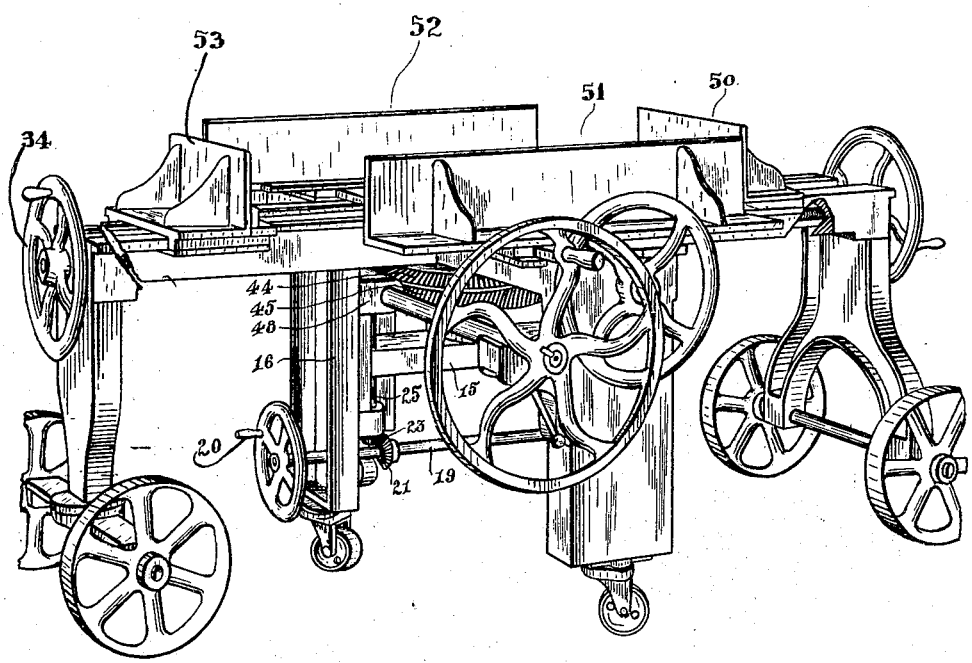
Figure 3 is a perspective view of the machine complete.
Figure 4:
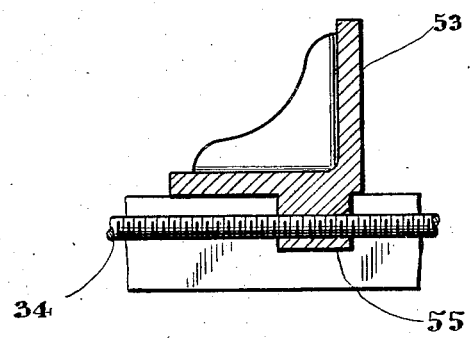
Figure 4 is a sectional detail of the screw adjustment.

Referring to the drawings, the adjusting mechanism for the workholder is formed of the inner frame 15 slidable in relation to the outer frame 16, the latter having a dovetail 17 on which the frame 15 slides in the dovetail groove 18.

The releasing mechanism is formed of the shaft 19 rotatably mounted in the frame 16 and operated by the handle 20, said shaft 19 carrying the bevel gears 21 and 22 co-acting with the bevel gears 23 and 24 respectively. The bevel gears 23 and 24 are fixedly secured on the progressive screws 25 and 26 swivelly mounted in the lugs 27 and 28 from the outer frame 16 and threaded into the lugs 29 and 30 from the inner frame 15, respectively. Thus by operating the handle 20, the frame 15 is made to slide on the outer frame 16 which carries the clamp setting shafts 31, 32, 33 and 34 in diametrically opposite journal bearings 35 and 36 and diametrically opposite journal bearings 37 and 38. The bevel pinions 39 and 40 are mounted respectively on the shafts 31 and 32 and held by the set screws 41 and the bevel pinions 42 and 43 are mounted respectively on the shafts 33 and 34 and held by the set screws 41 and all of these pinions co-act with the miter gear 44 mounted on and rigidly secured to the worm wheel 45, the latter being mounted on the stub shaft 46 journalled in the ball bearings 47 secured centrally on the inner frame 15. The frame 15 also supports the bearings 48 for the shaft of the worm 49, which engages and operates the worm wheel 45 to tighten or release the clamps through the movement of the inner frame.

In the operation, the clamp shafts 31, 32, 33 and 34 are preferably threaded inwardly from their outer ends and engage gripping members correspondingly threaded. The clamping gears 39, 40, 42 and 43 are first released from the miter gear 44, which leaves the clamp shafts free for adjustment as to centre desired. This is done by turning the handle 20 and drawing the inner frame along the outer frame. Subsequent to the adjustment of the clamp shafts with the coincident movement of the two frames, the handle 20 is turned in the opposite direction and the pinions again close up to the miter gear and the worm wheel is operated to tighten up on the gripping members. The attachment of this device is entirely a matter of the particular use to which it is to be put and need not be described herein, as the essential features of the invention are the release of the clamps for setting purposes and the coincident gripping abilities form four evenly divided points.

The gripping members indicated by the numerals 50, 51, 52 and 53 are mounted respectively on the shafts 31, 32, 33 and 34. These shafts in each instance extend through a lug 55 extending downwardly from each gripping member and are threaded in the said lugs so that on the turning of the shaft, the gripping members travel thereon, to and from the centre.

These shafts are mounted in the ends of the frames and while the shafts and pinions always remain in the same position longitudinally, the gripping members are moved by the rotation of the pinions.

As has been explained the work is placed under the drill, milling cutter, planer or other cutting machine and is adjusted to the desired position by the hand wheels at the ends of the said shafts 31, 32, 33 and 34. These wheels will move the gripping members also to and from the work and may be moved to actually push the piece of work in one or another direction.

As soon as these gripping members have been moved up to the work, then the pinions are brought into coaction with the bevel gear by moving the latter upwardly through the sliding of the inner frame, and when these pinions are in engagement with the bevel gear, the turning of this bevel gear by means of the large wheel, draws the gripping members into close engagement with the work, so that the latter is held firmly in position under the drilling or cutting tool.

What I claim is:

In a work holder mechanism, a four way clamp comprising an outer frame, an inner frame, a cooperating rib and groove on the frames for slidably mounting the inner frame within the outer frame, two sets of clamp setting shafts journalled in said outer frame and carrying pinions at their ends, gripping members adjustably engaged by said shafts, a worm operated gear mechanism connected in said inner frame and co-acting with said pinions, and means for sliding the inner frame in order to release said gear mechanism from said pinions.

Signed at the city of Stratford, this 26th day of April, 1927.

FREDERICK GORREE.